(12) United States Patent
Ghilardi

(10) Patent No.: US 7,338,091 B2
(45) Date of Patent: Mar. 4, 2008

(54) SWIVEL JOINT SYSTEM

(75) Inventor: Jean-Pierre Ghilardi, Montlignon (FR)

(73) Assignee: Societe Europeenne d'Ingeniere Mecanique-Eurodim, Rueil Malmaison (FR)

( * ) Notice: Subject to any disclaimer, the term of this patent is extended or adjusted under 35 U.S.C. 154(b) by 0 days.

(21) Appl. No.: 10/530,711

(22) PCT Filed: Oct. 10, 2003

(86) PCT No.: PCT/FR03/03005

§ 371 (c)(1),
(2), (4) Date: Sep. 13, 2005

(87) PCT Pub. No.: WO2004/033950

PCT Pub. Date: Apr. 22, 2004

(65) Prior Publication Data

US 2006/0108799 A1 May 25, 2006

(30) Foreign Application Priority Data

Oct. 11, 2002 (FR) .................................. 02 12694

(51) Int. Cl.
*F16L 27/00* (2006.01)

(52) U.S. Cl. ...................... 285/272; 285/47; 285/121.6; 285/281; 285/904

(58) Field of Classification Search ............... 285/47, 285/121.6, 190, 272, 276, 278–281, 904
See application file for complete search history.

(56) References Cited

U.S. PATENT DOCUMENTS

| 803,648 | A | * | 11/1905 | Williams | 144/242.1 |
|---|---|---|---|---|---|
| 2,450,895 | A | * | 10/1948 | Keim | 285/121.3 |
| 2,834,465 | A | * | 5/1958 | McMichael | 210/95 |
| 3,371,946 | A | * | 3/1968 | Bleyle, Jr. et al. | 285/47 |
| 3,414,918 | A | * | 12/1968 | Petrie et al. | 441/5 |
| 3,775,989 | A | * | 12/1973 | Mursinna et al. | 62/50.7 |
| 4,262,712 | A | * | 4/1981 | Young | 141/392 |
| 4,844,514 | A | | 7/1989 | Chauvin et al. | |
| 4,900,039 | A | * | 2/1990 | Klecker et al. | 277/320 |
| 6,623,043 | B1 | * | 9/2003 | Pollack | 285/121.2 |

FOREIGN PATENT DOCUMENTS

| EP | 0 188 161 | | 7/1986 |
|---|---|---|---|
| FR | 2 539 481 | | 7/1984 |
| WO | WO 99/50173 | * | 3/1999 |

\* cited by examiner

*Primary Examiner*—Aaron Dunwoody
*Assistant Examiner*—Fannie C. Kee
(74) *Attorney, Agent, or Firm*—Leydig, Voit & Mayer, Ltd.

(57) ABSTRACT

A swivel joint system for a cryogenic liquid transfer line, such as a liquefied natural gas line, and for return of cold gas associated with the cryogenic liquid transfer. The system includes a swivel joint for the passage of the cryogenic liquid and a swivel joint for the return of the cold gas. Each swivel joint includes a conduit with a fixed conduit portion and a rotating conduit portion, rotating relative to the fixed conduit portion, and a rotational guide interposed between the fixed and rotating conduit portions. The swivel joint device for the passage of the gas return is integrated in the swivel joint device for the passage of the cryogenic liquid.

11 Claims, 4 Drawing Sheets

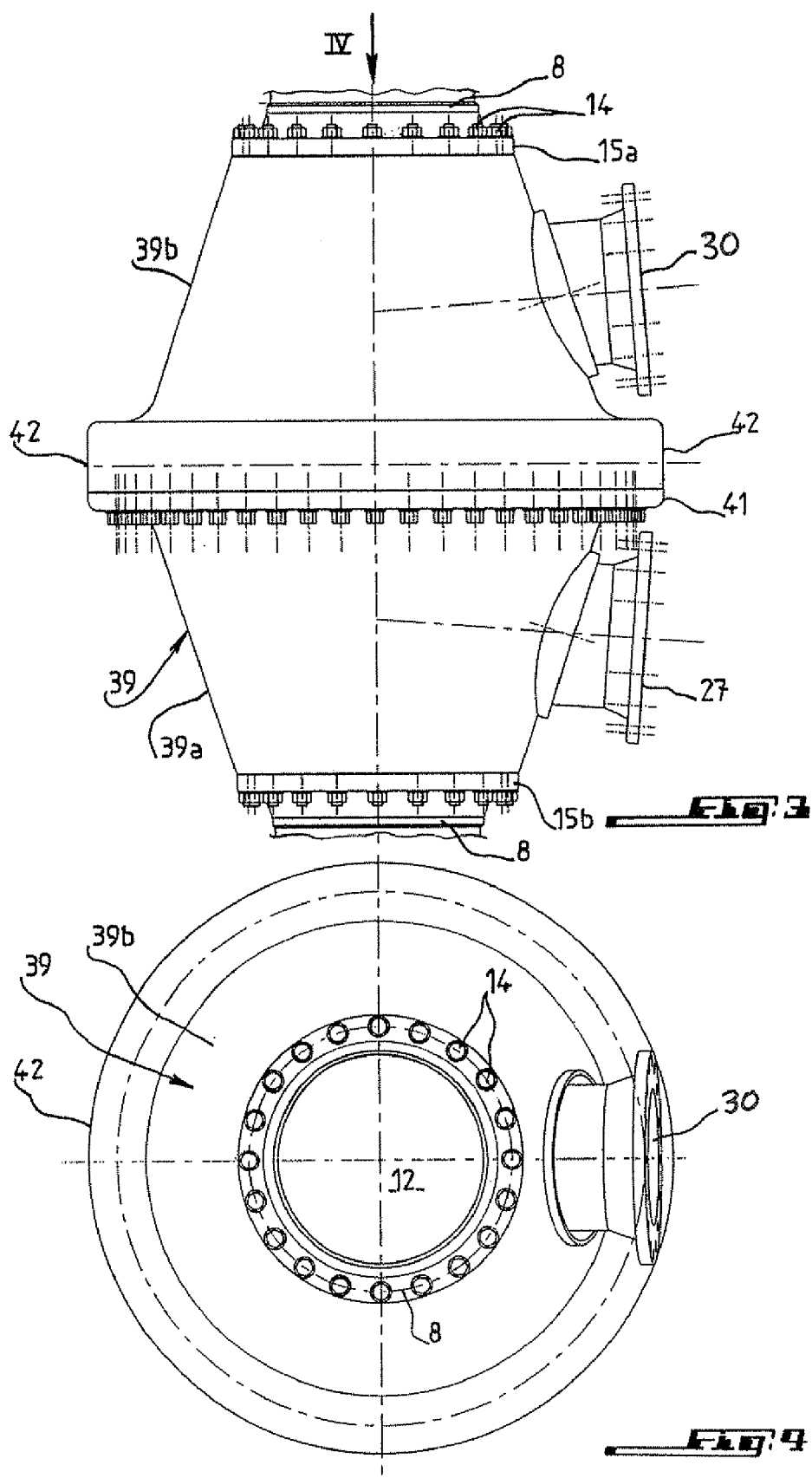

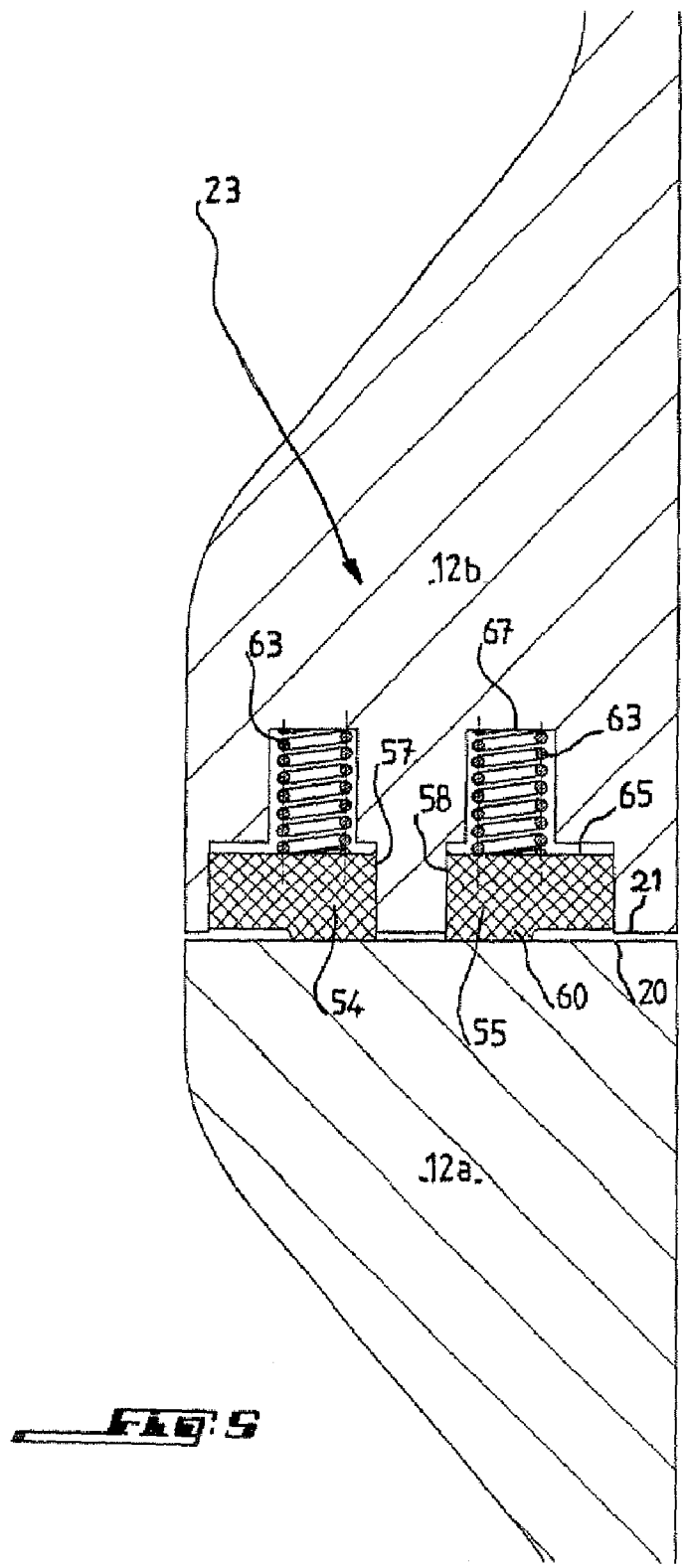

SWIVEL JOINT SYSTEM

FIELD OF THE INVENTION

The invention concerns a swivel joint system for a cryogenic liquid transfer line, such as a liquefied natural gas line and for the return of cold gas associated with the cryogenic liquid transfer, comprising a swivel joint device for the passage of the cryogenic liquid and a swivel joint device for the return of the cold gas, each device comprising a conduit provided with a fixed conduit portion and a rotating conduit portion rotating relative to the fixed conduit portion and a rotational guiding means interposed between the two conduit portions.

BACKGROUND

A system of this type is known from European Patent No. 0188161. In this system, the two swivel joint devices for the passage of the cryogenic liquid and the return of the gas are independent devices, the conduit intended for the passage of the return of the gas concentrically surrounding the fixed conduit portion of the joint device for passage of the cryogenic liquid, with a layer of thermal insulation interposed between the two concentric conduits.

This system in swivel joint form has the disadvantage of having a complex structure and of being encumbering.

SUMMARY OF THE INVENTION

The present invention aims to offer a swivel joint system which mitigates this disadvantage.

To realize this aim in the swivel joint system according to the invention, the swivel joint device for passage of the return gas is integrated in the swivel joint device for passage of the cryogenic liquid, and one and the same rotational guiding device is used for the two devices.

BRIEF DESCRIPTION OF DRAWINGS

The invention will be better understood, and other aims, characteristics, details and advantages thereof will appear more clearly in the following explanatory description with reference to the appended schematic drawings, provided only as an example, illustrating an embodiment of the invention and in which:

FIG. 3 is a side view of the swivel joint system according to FIG. 2;

FIG. 4 is a view in the direction of arrow IV of FIG. 2 and,

FIG. 5 is an enlarged detail of (V) indicated in FIG. 2.

DETAILED DESCRIPTION

Figure 1:
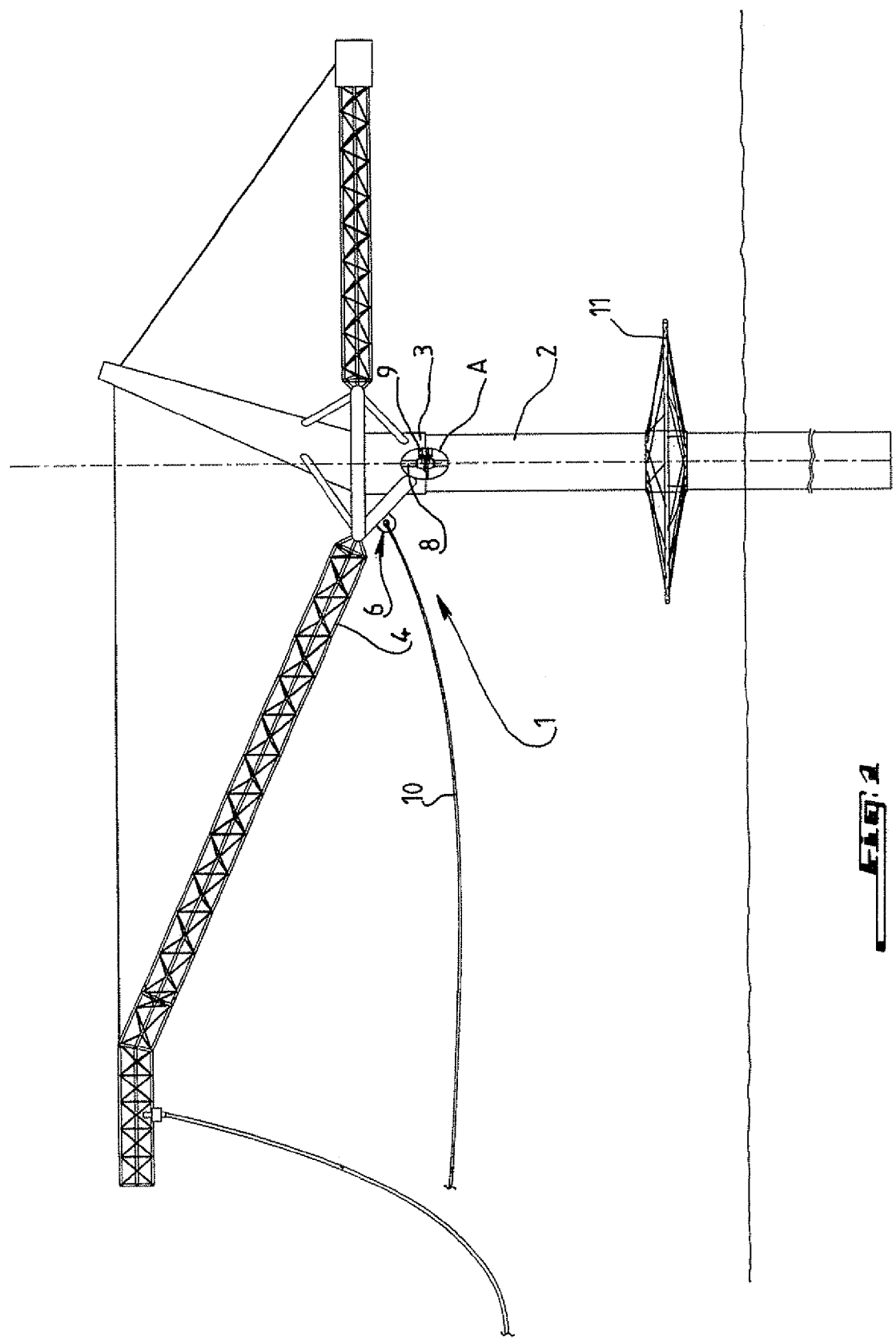
FIG. 1 is a simplified elevation of an offshore station for transfer of liquefied natural gas between a transport ship and a storage station, which is equipped with a swivel joint system according to the invention which is indicated as A and which can be seen through a window torn away from the column of the offshore station.

FIG. 1 illustrates, as an example of the application of the invention, the use of a swivel joint system according to the invention in an offshore station for the transfer of liquefied natural gas from a ship moored to this station and a storage station located remotely from the offshore station.

The offshore station has column 2, which rests on the sea bottom, and whose head 3 is capable of turning about the axis of the column. This head carries boom 4, and a liquefied natural gas transfer hose and another gas return hose hang at the free end of the boom 4. The other ends of the hoses can be connected to the manifold of the transport ship. Seen as 6 in FIG. 1 is a ring for mooring the ship by means of cable 10 which is connected with rotary head 3. FIG. 1 shows as 11 a circular guard surrounding the column. Inside of column 2, mounted at the site of rotary head 3, is a swivel joint system according to the invention, designated by reference A. This joint system is mounted in pipe fitting 8 for the transfer of liquefied natural gas and in conduit 9 for the return of the gas.

Figure 2:
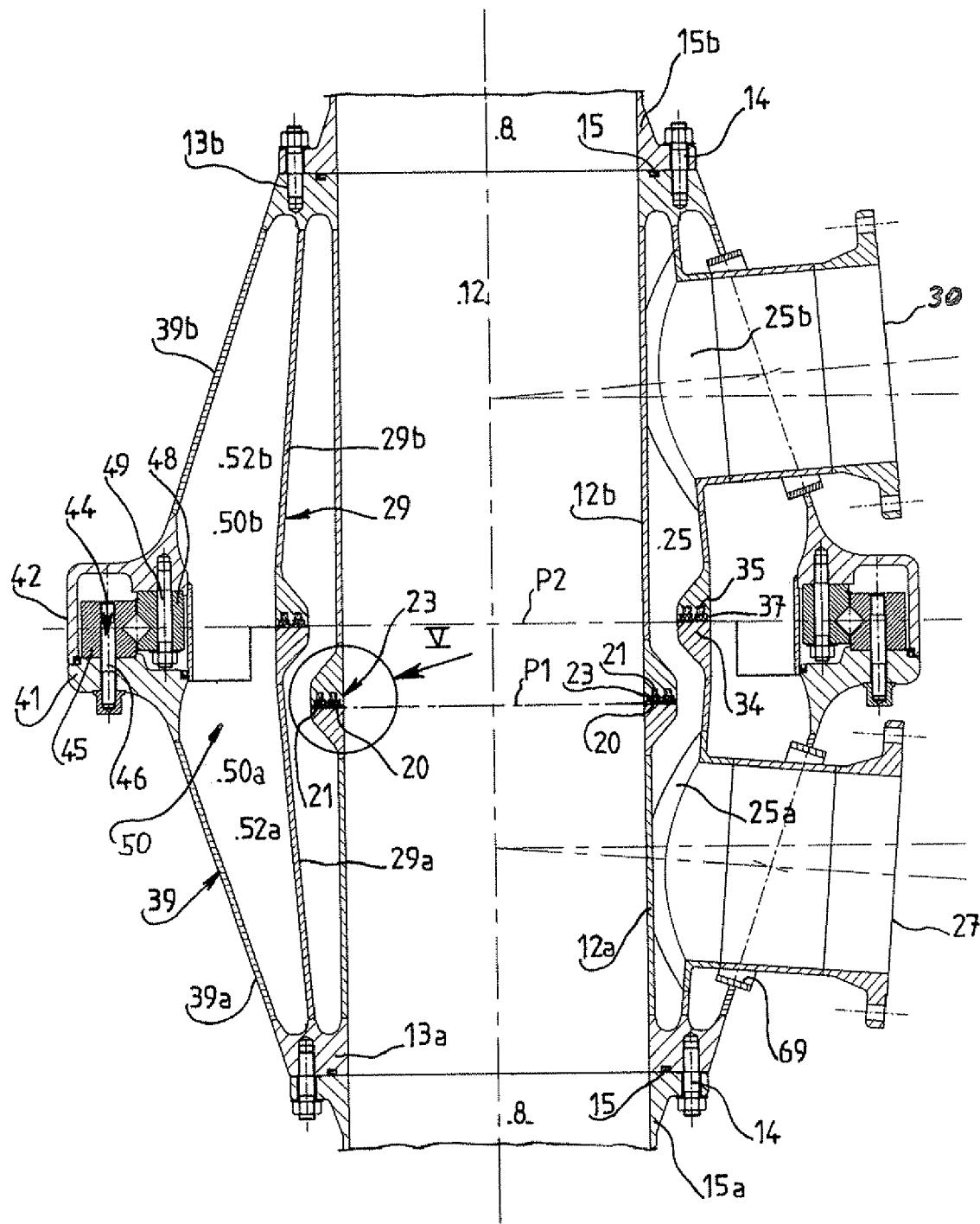
FIG. 2 is an axial section of swivel joint system A as indicated in FIG. 1.

With reference to FIG. 2, swivel joint system A according to the invention will be described below in greater detail.

Swivel joint system A includes central conduit 12 for the passage of the liquefied natural gas, which is connected at the upper and lower part to the transfer pipe fitting provided inside column 2 of offshore station 1. The connection of the joint system to pipe fitting 8 takes place at the upper and lower part by means of screws 14, as seen in particular in FIGS. 3 and 4, with the insertion of annular seal 15 between end flanges 13a, 13b, 15a, 15b of the joint system and of the pipe fitting.

Central conduit 12 has lower conduit section 12a, which is fixedly mounted inside of the column and upper section 12b, which is mounted to rotate with respect to fixed lower section 12a. Provided between the two end surfaces 20 and 21, respectively facing each other, of fixed section 12a and rotary section 12b, is an appropriate seal 23 which allows extensive relative annular movement of the two sections 12a and 12b. Provided around central conduit 12, coaxially to this conduit, is annular space 25, which is delimited radially inside by central conduit 12 and radially outside by wall 29. Wall 29 extends betweentwo flanges 13a, 13b. Space 25, which is therefore closed at the top and bottom, constitutes the gas return conduit, which enters space 25 through lateral entrance joining piece 27 and leaves this space through lateral exit joining piece 30.

The gas return conduit, formed by space 25, has lower part 25a which coaxially surrounds fixed lower section 12a of central conduit 12 while being connected to it, and upper part 25b which coaxially surrounds rotary upper section 12b of central conduit 12 while being connected to this section. Consequently, upper part 25b rotates with respect to lower part 25a of gas return conduit space 25. Provided between the two parts 25a and 25b, in exterior wall 29, between end surfaces 34 and 35 facing one another, is seal 37 which will be described in greater detail below.

The two seals 23 and 37, respectively belonging to central conduit 12 for passage of the liquefied natural gas and to gas return conduit 25, are in parallel, but axially offset, planes. The assembly formed by central conduit 12 and wall 29 coaxially surrounding it, forming conduit space 25, is surrounded by exterior jacket 39, which extends coaxially between the upper 13b and lower 13a flanges and is divided into two portions, fixed lower portion 39a and rotary upper portion 39b. Free ends 41, 42 facing one another, in the form of flanges, of jacket 39 bear a rotational guiding device in the form of a roller orientation ring, such as rotational bearing 44 which is arranged, for example, in plane P2 of seal 37 of gas return conduit space 25. The rolling bearing, which forms a mechanical guiding device for the two parts of joint system A, can be of any known and appropriate nature, for example, ball bearings or a roller bearing. These rotational components are arranged between bearing part 45, attached by screws 46 at end 41, in the form of a flange, of fixed lower jacket portion 39a, and part 48 is held by screws 49 at free end 42 of rotary upper jacket portion 39b.

As seen in FIG. 2, jacket portions 39a and 39b extend from the lower and upper flanges of the joint system to plane P2, while they diverge from respective wall portions 29a and 29b. Thus, annular space 50 is delimited between wall 29 and jacket 39, which has lower portion 50a and upper portion 50b, depending on whether one is in the fixed part or the rotating part of the joint. Each partial space 50a and 50b is filled, for example, with a block of thermally insulating material 52a, 52b, the two sides of the blocks facing one another being suitable for sliding over one another during angular movement of the part of the joint that moves with respect to the fixed part. The sides in contact have a stepped profile.

As seen in the figures, the single rotational bearing of the swivel joint system according to the invention is on the exterior periphery and can therefore operate at a temperature close to ambient temperature, and, therefore, a non-cryogenic temperature.

Seals 23, 37 are configured so that they are able to absorb extensive radial and axial movements and can be produced in the manner represented in FIG. 5. The seal represented as an example has two rings 54, 55 made of an appropriate material such as polytetrafluoroethylene, for example, each of which is received in groove 57, 58 in front surface 21 of upper central conduit section 12b. Grooves 57, 58 are concentric. Each sealing ring 54, 55, on its side facing front surface 20 of tower central conduit section 12a, comprises projecting portion 60 whose front surface is squeezed between surface 20 under the effect of spring 63 inserted between rear surface 65 of the ring and bottom 67 of grooves 57, 58 for receiving the sealing ring.

With reference to FIG. 2, it is again observed that cylindrical entrance and exit joining pieces 27, 30 of the gas return conduit pass through circular openings 69 formed in exterior jacket 39.

As an example, the structure of swivel joint A according to the invention is made of stainless steel of type AISI 316 L and can be arranged with a vertical or horizontal axis of rotation.

Of course, various modifications can be made to the joint as represented and described, provided that its essential characteristics are complied with, namely a single rotational guiding device for the lines for the passage of liquefied natural gas and the vapor return, and the compact integrated structure in which the fixed and rotating parts of the central conduit for passage of the cryogenic liquid and of the vapor return conduit are respectively arranged coaxially in such a way that the wall of central conduit 12 constitutes the radially internal wall of gas return conduit 25.

The swivel joint system according to the invention therefore has the advantages of a shared wall of the coaxial joint devices, which is made possible by a merged architecture in the form of a single module with a single "hot" and thus "standard" mechanism which is reliable over time and can resist the forces of the pipe fittings. The shared wall makes it possible that thermal insulation need not be placed between the liquefied natural gas and the gas vapor, in the gas circuit or in the vapor circuit.

The invention claimed is:

1. A swivel joint system for a cryogenic liquid transfer line, including a cold gas return, comprising a swivel joint device for passage of the cryogenic liquid and a swivel joint device for return of the cold gas, each swivel joint device comprising a conduit including a fixed conduit portion and a rotating conduit portion rotating relative to the fixed conduit portion and rotational guiding means interposed between the fixed and rotating conduit portions, wherein the swivel joint device for return of the cold gas is integrated in the swivel joint device for the passage of the cryogenic liquid and the two swivel joint devices are combined in a single rotational guiding device.

2. The swivel joint system according to claim 1, wherein the single rotational guiding device is a rotational bearing for the two swivel joint devices.

3. The swivel joint system according to claim 1, including
a central conduit for passage of the cryogenic liquid, an annular cold gas return conduit coaxially surrounding the central conduit,
an exterior jacket coaxial with the central conduit,
two end flanges between which the exterior jacket is located, wherein the central conduit, the annular conduit, and the exterior jacket are two axially aligned sections which rotate with respect to one another,
a rotational bearing located between facing surfaces of parts of the jacket, and
seals located between the facing surfaces of sections of the central and annular conduits, the rotational bearing and the seals being located in planes which are substantially parallel.

4. The swivel joint system according to claim 3, including an annular space between the annular conduit and the exterior jacket filled with a thermally insulating material in two blocks, each block being located in one of the fixed and rotating sections of the joint, the two blocks permitting rotational movement between the annular conduit and the exterior jacket.

5. The swivel joint system according to claim 3, wherein a radially internal wall of the annular conduit is formed by the wall of the central conduit for passage of the cryogenic liquid.

6. The swivel joint system according to claim 5, wherein the seals are respectively located in the central conduit, and in the exterior wall, delimiting the annular conduit.

7. The swivel joint system according to claim 6, wherein the seals include two rings made of a sealing material, placed concentrically in corresponding portions of the central conduit and pressed by a spring.

8. The swivel joint system according to claim 3, wherein the coaxial central conduit and annular conduit have a shared wall.

9. The swivel joint system according to claim 2, wherein the rotational guiding device includes a roller bearing.

10. The swivel joint system according to claim 1, wherein the fixed conduit portion of the passage of the cryogenic liquid and the rotating conduit portion of the of the passage of the cryogenic liquid contact each other only in a plane perpendicular to the axis of the system, and the fixed conduit portion of the return of the cold gas and the rotating conduit portion of the return of the cold gas contact each other only in a plane perpendicular to the axis of the system.

11. A swivel joint system for a cryogenic liquid transfer line, comprising an arrangement including
a central conduit for passage of the cryogenic liquid;
an annular cold gas return conduit coaxially surrounding the central conduit;
an exterior jacket coaxial with the central conduit;
an end flange at each axial end of the arrangement by which the system is connected to a flange of the cryogenic liquid transfer line;
two axially aligned arrangement sections, each having a central conduit section;
an annular conduit section; and
a jacket section;
the two arrangement sections with the central conduit, annular conduit and jacket sections being rotatable with respect to one another;
a single rotational guiding device located between facing surfaces of the axially aligned jacket sections; and
seals being located between facing surfaces of the central and annular conduit sections;
the facing surfaces and the single rotational guiding device being located in planes which are substantially parallel to one another and perpendicular to a longitudinal axis of the arrangement.

* * * * *